United States Patent [19]
Hufstader

[11] 3,901,103
[45] Aug. 26, 1975

[54] DIFFERENTIAL GEAR MECHANISM
[75] Inventor: Gibson O. Hufstader, Utica, Mich.
[73] Assignee: General Motors Corporation, Detroit, Mich.
[22] Filed: Mar. 28, 1974
[21] Appl. No.: 455,569

[52] U.S. Cl. .................. 74/713; 74/607; 74/710
[51] Int. Cl.² ................ F16H 1/40; F16H 57/02
[58] Field of Search ............... 74/713, 607, 710; 301/124 H; 180/88

[56] References Cited
UNITED STATES PATENTS

| | | | |
|---|---|---|---|
| 997,606 | 7/1911 | Demmler | 74/713 |
| 1,946,051 | 2/1934 | Alden | 74/713 |
| 3,673,889 | 7/1972 | Hauser | 74/713 |

Primary Examiner—Samuel Scott
Assistant Examiner—John Reep
Attorney, Agent, or Firm—Ronald L. Phillips

[57] ABSTRACT

A differential gear mechanism having long bolts spanning the large access hole in the differential case to increase the case strength in this region.

3 Claims, 4 Drawing Figures

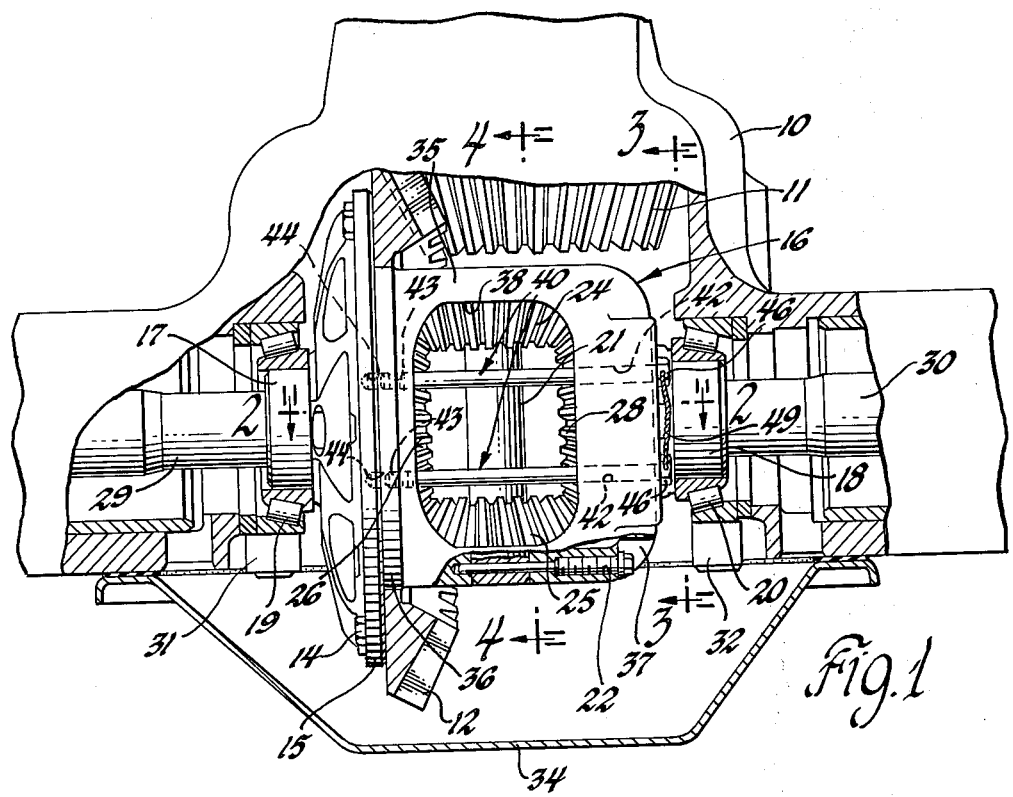

DIFFERENTIAL GEAR MECHANISM

This invention relates to differential gear mechanisms and more particularly to means for strengthening their differential case.

In differential gear mechanisms such as rear axle differentials, it is common practice to provide a differential case of iron which is cast in one piece and has a large opening through which the internal parts such as gears, clutch plates, etc., are installed. While this large opening is very desirable from an installation standpoint, it reduces the stiffness of the one-piece cast iron differential case and thus limits its load capacity to a value below that of a case without such provision. I have found that this large installation opening in the differential case can be retained without reducing case strength or stiffness and in a simple, low cost way which is easy to manufacture and install. This is accomplished by means of one or more bolts which are arranged to span the large installation opening and thread into the flange end of the case with their installation being made after all the internal parts are in place in the case. As a result, the axial loads that were previously supported by the cast iron around the sides of the large installation opening are now carried directly across the opening to the opposite end of the case. Thus, the strength of the one-piece cast iron differential case is not affected by the largeness of the installation opening after installation of the internal parts and the case is thus capable of carrying greater loads.

An object of the present invention is to provide a new and improved differential gear mechanism.

Another object is to provide new and improved means for strengthening the case of a differential gear mechanism wherein the case has a large opening for installation of its internal parts.

Another object is to provide in a differential gear mechanism having a differential case with a large opening through which the internal parts thereof are installed, several bolts for spanning this opening after the internal parts have been installed to provide a normal stiffness to the case which would otherwise be reduced by the largeness of this opening.

These and other objects of the present invention will be more apparent from the following description and drawing in which:

FIG. 1 is a plan view partly broken away and in section of an automotive vehicle differential gear mechanism with a differential case strengthened according to the present invention.

FIG. 2 is an enlarged view taken along the line 2—2 in FIG. 1.

Figure 3:
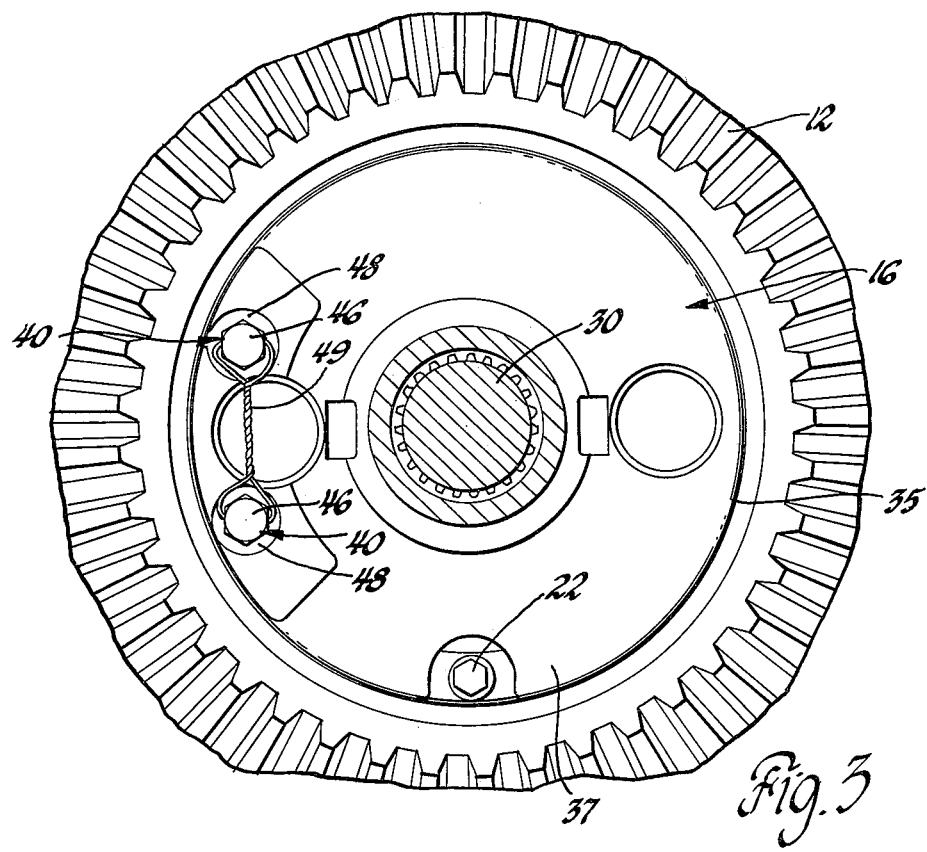
FIG. 3 is an enlarged view taken along the line 3—3 in FIG. 1.

Referring to the drawing, the invention is shown in an automotive vehicle rear differential gear mechanism comprising a housing 10 in which is rotatably supported a drive pinion 11, such support being in the usual manner by a pair of axially spaced bearings, not shown. The drive pinion 11 is beveled and meshes with a ring gear 12 which is also beveled and has its axis at right angles to the axis of the drive pinion. The ring gear 12 is secured by a plurality of bolts 14 to the flange 15 of a rotary differential case 16 that is rotatably supported by hubs 17 and 18 at its outboard ends in the housing 10 by side bearings 19 and 20, respectively. A pinion gear shaft 21 is arranged at right angles to the axis of case 16 and is secured to the case by a locking bolt 22. The pinion gear shaft 21 rotatably supports within the case 16 a pair of beveled pinion gears 24 and 25 which each mesh at opposite sides with a pair of beveled side gears 26 and 28. The side gears 26 and 28 are splined to the inboard ends of a pair of axle shafts 29 and 30, respectively, that project through the case's hubs 17 and 18. The two side bearings 19 and 20 are retained by bearing caps 31 and 32 that are bolted to the housing 10. The access through the open rear side of the housing to the caps and the other parts are closed by a cover 34 that is bolted to the housing's rear side. The differential gear mechanism thus far described is of a conventional type operatively connecting its input to its two outputs while dividing the input torque between them and permitting one output to rotate faster than the other for vehicle turning without slippage.

Figure 4:
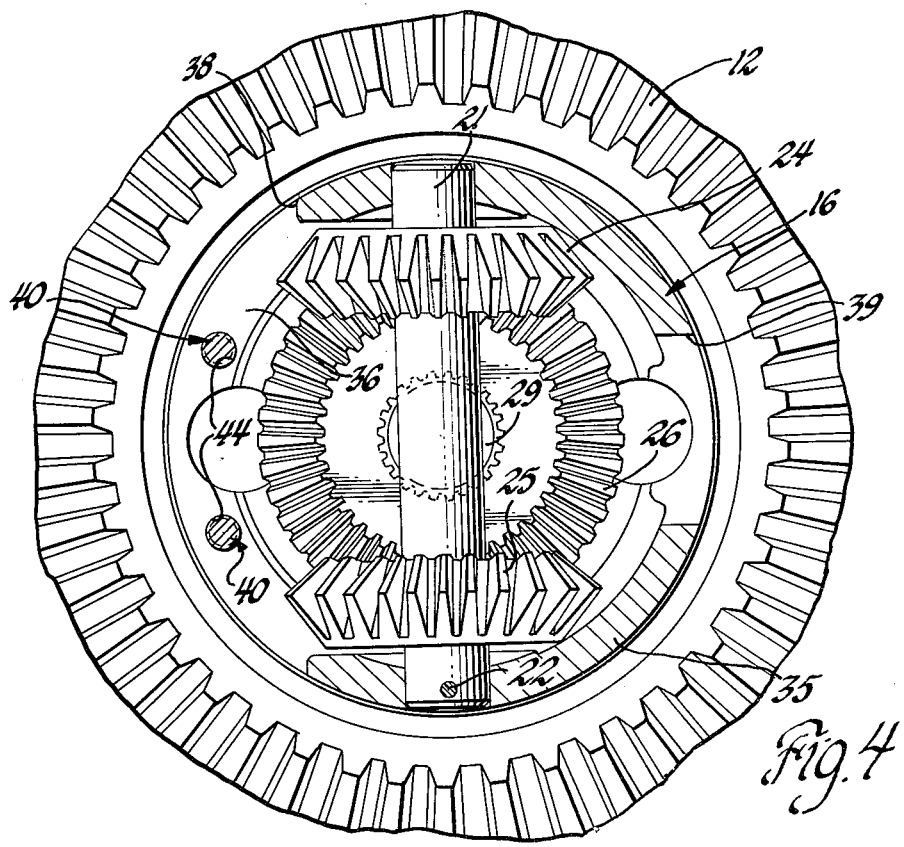
FIG. 4 is an enlarged view taken along the line 4—4 in FIG. 1.

In such an assembly it is common practice to make the differential case 16 from a one-piece iron casting with a cylindrical portion 35 extending between two radial end walls 36 and 37 and with the hub 17 and flange 15 contiguous with end wall 36 and the hub 18 contiguous with the other end wall 37 as best shown in FIGS. 1, 2 and 4. In addition, there are provided lightening holes in the cylindrical portion 35 including a large generally rectangularly shaped opening 38 through which all of the case's internal parts can be installed and a hole 39 in a diametrically opposite location of much smaller size for balance as well as lightening. The large installation opening 38 is thus between the case's two ends and reduces the bending stiffness of the one-piece cast iron differential case to a substantially greater degree than the much smaller hole 39. As a result, the case's load capacity is limited to a value below that of a multi-piece case, for example, wherein a large access or installation hole is not required for assembly of the internal parts.

According to the present invention the large installation opening 38 in the one-piece cast iron case 16 is retained for assembly of the internal parts but the case strength or stiffness is not reduced because of the largeness of this opening and in a simple, low cost, easy to manufacture and install way. This is accomplished by means of one or more long bolts 40 which in the case of two or more as shown are equally circumferentially spaced in the large installation opening 38 and extend axially of the case to span this opening as best shown in FIGS. 1, 2 and 4. Each of the bolts 40 extends through a hole 42 drilled in the end wall 37 and has its threaded end 43 engaging a tapped hole 44 in the end wall 36 having the radially outwardly located ring gear attaching flange 15 as best shown in FIG. 1. The head 46 of the bolt engages a spot face 48 machined on the exterior of the case end wall 37 as best shown in FIG. 3 and the bolt is torqued to tension the bolt to load the case in the axial direction and thereby provide stiffness to bending. The bolts 40 are, of course, installed after the case's internal parts are assembled and are then locked together by a lock wire 49 to prevent their backing out. As a result, the loads that were previously supported by the cast iron around the sides of the large installation opening 38 are now carried directly across the opening to the case's end walls 36 and 37 by the strengthening bolts 40. Thus, the strength of the one-piece cast iron differential case 16 is not actually affected by the oversize of the opening 38 that is required for installation of the internal parts and the case is thus capable of carrying loads above the limit normally imposed by the large installation opening. It will also be appreciated that while the invention has been shown in a non-locking type differential, it is equally applicable to locking type differentials wherein there is provided a one-piece cast iron case and the internal parts that must be inserted through the large installation opening may include in addition to the gears, a set of clutch plates, springs, etc., comprising the locking portion of the differential mechanism.

The above described embodiment is illustrative of the invention which may be modified within the scope of the appended claims.

I claim:

1. A differential gear mechanism comprising a housing, a drive pinion rotatably supported in said housing, a one-piece rotary case rotatably supported in said housing, said rotary case having a pair of axially spaced radially extending end walls and a cylindrical wall extending between said end walls, one of said end walls having a flange, a ring gear secured to said flange and meshing with said drive pinion, a pair of side gears rotatably supported in said case, a differential gear rotatably supported in said case and meshing with both said side gears, a permanent opening in said cylindrical wall normally large enough to permit installation of all internal parts including said side gears and differential gear in said case, at least one strengthening bolt extending axially of said case and spanning said installation opening, said bolt received in an axially extending hole in the other of said end walls and having a threaded end engaging a tapped hole in said one end wall and a bolt head at the other end engaging the outer side of said other end wall whereby after the internal parts are installed in said differential case through said installation opening and said bolt is then torqued a predetermined amount there is provided added bending stiffness by said bolt to offset the affect of said opening.

2. A differential gear mechanism comprising a housing, a drive pinion rotatably supported in said housing, a one-piece cast iron rotary case rotatably supported in said housing, said rotary case having a pair of axially spaced radially extending end walls and a cylindrical wall extending between said end walls, one of said end walls having a radially outwardly located flange, a ring gear secured to said flange and meshing with said drive pinion, a pair of side gears rotatably supported in said case, a differential gear rotatably supported in said case and meshing with both said side gears, a plurality of lightening holes in said cylindrical wall including an opening larger than any other hole by an amount sufficient to permit installation of said side gears and differential gear in said case, a plurality of strengthening bolts equally circumferentially spaced in said installation opening and extending axially of said case and spanning said installation opening, each said bolt received in an axially extending hole in the other of said end walls and having a threaded end engaging a tapped hole in said one end wall and a bolt head at the other end engaging the outer side of said other end wall whereby after the internal parts are installed in said differential case through said installation opening and said bolts are then torqued a predetermined amount of portion of the axial load in said case is carried directly across said installation opening between said end walls by said bolts so that the largeness of said installation opening is not permitted to affect the bending stiffness of said differential case.

3. A differential gear mechanism comprising a housing, a drive pinion rotatably supported in said housing, a one-piece cast iron rotary case rotatably supported in said housing, said rotary case having a pair of axially spaced radially extending end walls and a cylindrical wall extending between said end walls, one of said end walls having a radially outwardly located flange, a ring gear secured to said flange and meshing with said drive pinion, a pair of side gears rotatably supported in said case, a differential gear rotatably supported in said case and meshing with both said side gears, a plurality of lightening holes in said cylindrical wall including a generally rectangularly shaped opening larger than any other hole by an amount sufficient to permit installation of said side gears and differential gear in said case, at least a pair of strengthening bolts equally circumferentially spaced in said installation opening and extending axially of said case and spanning said installation opening, each said bolt received in an axially extending hole in the other of said end walls and having a threaded end engaging a tapped hole in said one end wall and a bolt head at the other end engaging the outer side of said other end wall whereby after the internal parts are installed in said differential case through said installation opening and said bolts are then torqued a predetermined amount a portion of the axial load in said case is carried directly across said installation opening between said end walls by said bolts so that the largeness of said installation opening is not permitted to affect the strength of said differential case.

* * * * *